United States Patent

Caslaw

[15] 3,661,639

[45] May 9, 1972

[54] SUPERCONDUCTING ELECTRICAL CONDUCTORS

[72] Inventor: James S. Caslaw, Ilford, England

[73] Assignee: The Plessey Company Limited, Ilford, England

[22] Filed: Feb. 20, 1969

[21] Appl. No.: 800,951

[30] Foreign Application Priority Data

Feb. 20, 1968 Great Britain........................8,319/68

[52] U.S. Cl.................................117/213, 29/599, 117/217, 117/230, 117/231, 117/227, 204/38 A

[51] Int. Cl........................B44d 1/18, C23b 9/00, B44d 1/34

[58] Field of Search.............117/114 B, 213, 221, 227, 230, 117/217, 231; 29/599; 204/56, 38 A

[56] References Cited

UNITED STATES PATENTS

| | | | |
|---|---|---|---|
| 3,352,008 | 11/1967 | Fairbanks | 29/599 |
| 3,429,032 | 2/1969 | Martin et al. | 29/599 |
| 3,436,258 | 4/1969 | Neugebauer et al. | 117/227 X |
| 3,486,146 | 12/1969 | Williams | 29/599 X |

*Primary Examiner*—Alfred L. Leavitt
*Assistant Examiner*—C. K. Weiffenbach
*Attorney*—Scrivener, Parker, Scrivener & Clarke

[57] ABSTRACT

In preparation of superconducting electrical conductors specifically niobium tin alloy, the reaction between niobium and tin is considerably accelerated if the niobium contains about 2,500 parts per million of oxygen before it is coated with tin. This concentration of oxygen does not have a harmful effect on the tape or its critical current density and the time for processing the tape may thus be considerably reduced.

5 Claims, 4 Drawing Figures

SUPERCONDUCTING ELECTRICAL CONDUCTORS

This invention relates to superconducting electrical conductors. It relates specifically to an improved method for making a wire or tape which is intended to be used for example in the production of a superconducting electromagnet and consists of an alloy of tin with a base of niobium containing a small percentage (e.g. up to 5 percent by weight) of zirconium.

The manufacture of the niobium tin alloy conductor as usually carried out at present requires the niobium or niobium alloy in the form of a wire or tape to be passed through a bath of melted tin in a furnace and this may be done in a continuous process to enable long lengths of the tape to be treated. The tape picks up a thin coating of tin in its passage through the bath and the tape subsequently is heated in a reaction furnace to cause the formation of niobium tin alloy $Nb_3Sn$ on the surface of the tape.

To prevent brittle and other undesirable affects occurring in the finished tape it is generally necessary to exclude free oxygen from contact with the tape in the furnaces. Precautions such as use of insert atmospheres are taken to ensure that this gas is substantially eliminated.

The formation of the niobium tin alloy takes a considerable time even at the elevated temperature of the reaction furnace. We have now found that the speed of this reaction and thus the depth of the layer that can be formed in a given time can be increased. Alternatively the time of residence of the tape in this furnace may be reduced enabling the reacting step to be very conveniently carried out in a short furnace in line with the furnace for the tinning operation.

According to one feature of the invention, in a process for making a superconducting wire or tape of niobium tin alloy in which zirconium is present, at least a surface layer of the tape is given a content of oxygen within the range of 500 to 5,000 parts per million before passing the tape through a tinning operation. Preferably the oxygen content is arranged to be about 2,000 or 3,000 parts per million.

According to a further feature of the invention the oxygen content of the tape is established in a pre-heating stage before the tape is passed into a furnace for the tinning operation. The heating operation may be carried out for a long enough time for the oxygen to diffuse throughout the thickness of tape. In a suitable furnace the tape may be heated in a gaseous atmosphere having oxygen present so that the required concentration of oxygen will be taken up by the tape. The concentration of oxygen in the preheat furnace may thus be reduced below that of the ambient atmosphere by means such as diluting oxygen with an inert gas, or operating at a reduced temperature or pressure.

According to yet a further feature of the invention, the oxygen addition to the tape is effected by a surface oxidation such as by an electrolytic oxidation process. The process may be one in which the tape is connected as an anode in a suitable electrolytic bath. The electrolytic oxidation process results in the formation of an oxide film on the surface of the tape. The tape carrying this film may then be heated to cause the oxygen to diffuse into the tape so that the required concentration of oxygen for the tinning operation is attained.

The invention further comprises a niobium tin alloy conductor when formed by any of the aforementioned methods and an electromagnet embodying such an alloy conductor.

By way of example, the invention will be further described with reference to the accompanying drawings in which.

Figure 1:
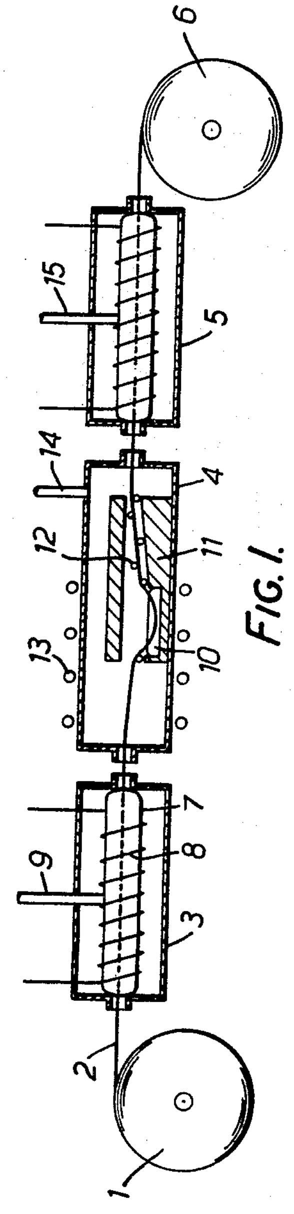
FIG. 1 shows apparatus for making a superconducting tape of niobium alloy.

The apparatus depicted in FIG. 1 comprised a feed spool 1 from which a length niobium 1 percent alloy tape 2 was fed through a preheat furnace 3, a tinning furnace 4, a reaction furnace 5, and on to a take up spool 6.

The preheat furnace comprised a furnace tube 7 of fused quartz glass 4½ feet in length which was wound with an electric heating coil 8. The heating coil enabled a zone three feet in length of the furnace tube to be maintained at a temperature in the region of 1,000° C. The niobium tape passing through the furnace could thus be preheated for the tinning operation in a gaseous atmosphere obtained by passing a suitable gas down an inlet tube 9.

After the preheat furnace 3 the tape was passed into a tinning furnace 4 in which a pool 10 of molten tin was contained in a graphite crucible 11. As the tape left the graphite crucible 11 it passed over a sloping ramp and across wiper rods 12 which acted to remove excess tin from the tape surface. The tinning furnace 4 and the pool 10 of tin were maintained at a suitable elevated temperature by means of radio frequency heating coils 13. A gas inlet tube 14 to this furnace enabled a suitable gaseous atmosphere to be provided for carrying out the tinning operation.

After the tinning furnace 4 the tape 2 passed into a reaction furnace 5 the construction of which was essentially similar to that of the preheat furnace 3. A gas inlet tube 15 to the reaction furnace provided a suitable atmosphere for the reaction between the tin and niobium alloy and the reacted tape was then allowed to cool so it might be wound on the takeup spool 6.

The following example explains one way of using the apparatus to make superconducting tape; 1,000 feet of niobium 1 percent zirconium alloy tape with dimensions 0.25 inches × 0.0005 inches (and oxygen content 250 parts per million) was cleaned by immersion in an ultrasonic bath containing propanol-2 for 2 minutes. The tape was then passed continuously at 2 feet per minute through the furnace tube 7 of the preheat furnace 3 the hot zone of which was controlled at 930° to 1,000° C. A stream of argon gas containing 2,000 parts per million by volume of oxygen was fed into the furnace tube 7 through the gas inlet tube 9. This concentration of oxygen was obtained by mixing gas from a cylinder of argon containing 1 percent by volume of oxygen with that from a cylinder of pure argon after having removed impurities such as nitrogen and water vapor from the gases. The presence of the argon was required to prevent contact of the hot tape with air and the oxygen was present to introduce oxygen into the tape. After leaving the preheat furnace the oxygen content of the tape was 2,000 parts per million.

The tape was next fed into the tinning furnace and through the pool 10 of tin in the crucible 11. The radio frequency heating coils 13 were operated to maintain the tin at a temperature of 950° C. and an inert atmosphere of pure argon was maintained in the tinning furnace 4. As the tape left the crucible excess tin was wiped off the tape surfaces by the wiper rods 12. In this way the tape was given a 2 micron thick layer of tin which would be enough to produce a 5 micron layer of niobium tin alloy in the finished tape.

The tape 2 was next passed into the reaction furnace 5 for a dwell time of four minutes at a temperature between 930° and 1,000° C. The tape in this furnace was maintained in an atmosphere of pure argon. We have found it desirable to exclude as far as possible the entry of oxygen into this furnace, since although if it is present in small quantities a tape is produced having a current-carrying capacity greater than would have been the case without pre-oxidation, the best results seem to be obtained when no oxygen or air is present in the atmosphere of this furnace. On leaving the furnace the tape was allowed to cool and was then collected on the take up spool 6.

After the tape had been collected on the take up spool its physical properties were examined to determine if the critical current density of the niobium tin alloy had been affected by the presence of the controlled proportion of oxygen in the tape. The critical current obtained from the tape after passing through the process described above was 250 amps at 46 kilogauss. Whereas using the same apparatus, conditions and tape but omitting the addition of oxygen at the preheating stage in a niobium alloy was prepared having a critical current of only 60 amps at 46 kilogauss. The pre-oxidation of the tape appeared therefore to be beneficial.

This improvement appeared to result from a considerable increase in the rate of niobium tin alloy growth, but there also seems to be a slight increase in the overall critical current density of the tape.

Figure 2:
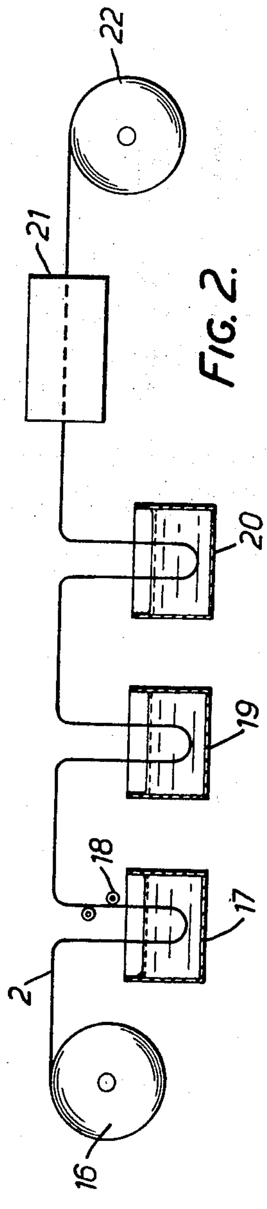
FIG. 2 shows apparatus for effecting oxidation of the tape by an electrolytic process.

FIG. 2 shows apparatus for a different way of adding oxygen to the tape which thus may be used to replace the step of adding oxygen to the tape in the preheat furnace 3.

The apparatus shown in FIG. 2 was constructed for an electrolytic addition of the oxygen and comprised a feed spool 16 from which tape 2 as received from the manufacture could be drawn. This tape was of the same kind and dimensions as that previously described. The tape 2 was passed first through an ultrasonically agitated cleaning bath 17 which was filled with propanol-2. On leaving the cleaning bath 17, the tape passed across a series of wipers 18 and then entered an anodising bath 19. The anodising bath 19 was filled with an electrolyte which was a one percent by weight solution in water of sodium sulphate. The anodising bath 19 was constructed of stainless steel and this container was electrically connected as the cathode for the electrolytic process. A roller (not shown) for holding the tape beneath the surface of the electrolyte formed a further electrical connector for the bath so that the tape 2 was connected as an anode for the electrolytic process. An electrical potential of about fifty volts could be applied between anode and cathode during operation of the bath.

After leaving the anodising bath 19, the tape 2 passed through a washing bath 20 filled with distilled water, through a drying oven 21 and the anodized tape was then rewound on a take up spool 22.

In operation of this anodising process it was found possible to feed the tape 2 through this apparatus at a rate of 5 feet per minute and the interference colors of oxide films produced on the tape gave a useful indication of thickness of the anodically oxidized layer. A potential of 50 volts between anode and cathode was typical for successful operation of the bath and the interference colors were found to vary as follows:

25 volts - color dark blue
37 volts - color light blue
50 volts - color pale straw
60 volts - color yellow
75 volts - color pink The choice of electrolyte for the anodising bath 19 was not found to be particularly critical and in addition to the electrolyte specifically described solutions of sulphuric acid and of phosphoric acid at the same concentration were also effective.

The anodized tape stored on the take up spool 22 was reasonably stable and could be stored until it was required for the tinning process. To effect the tinning operation, the tape was first passed continuously through a furnace having an argon atmosphere and which was maintained at a temperature of 1,000° C. for a tape dwell time of ten seconds. This heating operation caused the oxygen in the anodized surface layer to diffuse into the body of the niobium tape and in this way about 3,000 ppm of oxygen were obtained in the tape. The tape was thus in condition to be passed through the tinning furnace 19 of FIG. 1 and through the further stages illustrated in this Figure. This heating operation could conveniently be effected in line with the tinning furnace and these further stages.

The electrolytic method of adding oxygen was found to produce alloy tape that was equivalent to that obtained from absorption of oxygen gas and the electrolytic method was found to be capable of being accurately controlled and of giving a suitably consistent end product.

A further alternative method of pre-oxidizing the niobium alloy tape is by a relatively low-temperature surface oxidation treatment in an oxygen containing atmosphere. This treatment may be at 500° C. for example and it may be followed by a heat treatment (such as one at about 1,000° C.) in an inert gaseous atmosphere to diffuse the oxygen present in the surface layer throughout the body of the tape.

To complete manufacture of a superconducting tape it is generally necessary for it to be laminated with one or more layers of other electrically conductive material such as a copper or stainless steel tape.

Figure 3:
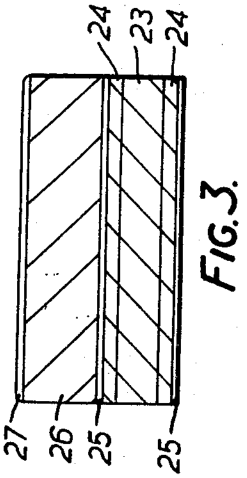
FIG. 3 shows a cross-sectional view on a greatly enlarged scale through one form of alloy tape according to the invention.

A cross-section on a greatly enlarged scale through a fully manufactured portion of superconducting tape of one kind is shown in FIG. 3. In this Figure, the original niobium alloy layer 23, 7 microns in thickness, has layers 24 of niobium tin ($Nb_3Sn$) alloy on either side of it. The layers 24 of niobium tin alloy are both 4 microns in thickness. On the outer surfaces of the niobium tin alloy layers 24, coatings 25 of solder are carried. A copper tape 26 which had been rolled into contact with the niobium alloy tape was joined to one side thereof by means of the intervening solder layer. The copper tape 26 itself carried an outer solder layer 27.

The purpose of laminating the niobium tin alloy tape with copper is to provide added strength and to give the tape some continuous electrically conductive property in the event of any breakage in the superconductive portion of this combination. It is not essential that a single copper layer should be present of course and other kinds of superconducting tape might have for example two copper layers possibly with one or two layers of stainless steel in addition.

Figure 4:
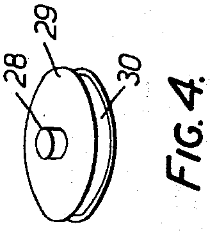
FIG. 4 shows a superconducting electromagnet embodying the alloy tape of the invention.

FIG. 4 shows one kind of superconducting electromagnet which was constructed from the tape of the invention. The electromagnet comprised a core 28, coaxial with which were located two discs 29 of a phenolic resin impregnated paper material. Between the discs 29, a length of superconducting tape 30 was wound in spiral fashion with an interleaving of an electrically insulating tape between adjacent turns.

The reason why the reaction for making the niobium tin alloy should have been accelerated by adding oxygen in these ways is not fully understood at present, but it seems likely that the oxygen combines with the zirconium present in the alloy and that this aids diffusion of tin into the niobium alloy.

The foregoing descriptions of embodiments of the invention have been given by way of example only and a number of modifications may be made without departing from the scope of the invention. For instance, when using the method requiring the gaseous addition of oxygen, instead of using argon as the diluent for oxygen in the preheat furnace and as an inert atmosphere in the other furnaces it would be possible to use some other gas such as helium which would have suitably inert characteristics. The presence of oxygen in the preheat furnace is also not limited to its occurrence as free oxygen and it is believed that the reaction would also be effective if suitable gaseous oxides such as carbon diode, sulphur dioxide, water vapor, nitrogen oxides or ozone were present.

What we claim is:

1. A process for making a superconducting wire or tape of niobium tin alloy including the steps of treating niobium wire or tape having a zirconium content up to 5% by weight to provide an oxygen content of from 500 to 5,000 parts per million in at least a surface layer of said wire or tape and subsequently depositing tin over said surface layer and thereafter heat treating the oxygen containing wire or tape to produce the superconducting niobium tin alloy.

2. A process as claimed in claim 1, in which the oxygen content is from 2,000 to 3,000 parts per million.

3. A process as claimed in claim 1, in which the oxygen content is provided by heating the wire or tape in a gaseous atmosphere containing oxygen.

4. A process as claimed in claim 1, in which the oxygen content is provided by surface oxidation of the wire or tape.

5. A process as claimed in claim 4, in which surface oxidation is effected by an electrolytic process.

* * * * *